United States Patent
Kanevsky et al.

(10) Patent No.: US 6,434,520 B1
(45) Date of Patent: Aug. 13, 2002

(54) SYSTEM AND METHOD FOR INDEXING AND QUERYING AUDIO ARCHIVES

(75) Inventors: Dimitri Kanevsky, Ossining, NY (US); Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/294,214

(22) Filed: Apr. 16, 1999

(51) Int. Cl.$^7$ .............................................. G10L 15/06
(52) U.S. Cl. .................... 704/243; 704/246; 704/245; 704/251
(58) Field of Search .................... 704/245, 246, 704/255, 231, 270–275, 247, 243, 233, 251, 257, 250; 379/67

(56) References Cited

U.S. PATENT DOCUMENTS

| | | | |
|---|---|---|---|
| 3,936,805 A | | 2/1976 | Bringol et al. |
| 5,465,290 A | * | 11/1995 | Hampton et al. ............. 379/67 |
| 5,550,966 A | | 8/1996 | Drake et al. |
| 5,598,507 A | * | 1/1997 | Kimber et al. .............. 704/246 |
| 5,606,643 A | | 2/1997 | Balasubramanian et al. |
| 5,649,060 A | | 7/1997 | Ellozy et al. |
| 5,655,058 A | | 8/1997 | Balasubramanian et al. |
| 5,659,662 A | * | 8/1997 | Wilcox et al. .............. 704/245 |
| 5,737,532 A | * | 4/1998 | Delair et al. ................ 709/219 |
| 5,774,841 A | * | 6/1998 | Salazar et al. ............. 704/225 |
| 5,897,616 A | * | 4/1999 | Kanevsky et al. .......... 704/246 |
| 5,918,223 A | * | 6/1999 | Blum et al. ...................... 707/1 |
| 5,937,383 A | * | 8/1999 | Ittycheriah et al. ......... 704/255 |
| 5,960,399 A | * | 9/1999 | Barclay et al. ........... 704/270.1 |
| 6,161,090 A | * | 12/2000 | Kanevsky et al. .......... 704/246 |
| 6,185,527 B1 | * | 2/2001 | Petkovic et al. ............ 704/231 |

FOREIGN PATENT DOCUMENTS

| | | |
|---|---|---|
| EP | 0507743 | 10/1992 |
| WO | WO9211634 | 7/1992 |

OTHER PUBLICATIONS

Wilcox et al., ("HMM–Based Wordspotting for Voice Editing and Indexing", 2nd European Conference on Speech Communication and Technology, Genova, Italy, Sep. 24–26, 1991, pp. 25–28).*
"Automatic Content–Based Retrieval of Broadcast News", ACM Multimedia 95—Electronic Proceedings, Nov. 5–9, 1995, San Francisco, California.
Sugiyama, et al., "Speech Segmentation and Clustering Based on Speaker Features", 1993 IEEE, pp. II–395–II–398.
Wilcox, et al., "Segmentation of Speech Using Speaker Identification", 1994 IEEE, pp. I–161–I–164.
Cohen, et al., "Data Retrieval through a Compact Disk Drive having a Speech–Driven Interface", IBM Technical Disclosure Bulletin, vol. 38, No. 01, Jan. 1995.

* cited by examiner

Primary Examiner—Vijay B Chawan
(74) Attorney, Agent, or Firm—F. Chau & Associates, LLP

(57) ABSTRACT

A system and method for indexing segments of audio/multimedia files and data streams for storage in a database according to audio information such as speaker identity, the background environment and channel (music, street noise, car noise, telephone, studio noise, speech plus music, speech plus noise, speech over speech), and/or the transcription of the spoken utterances. The content or topic of the transcribed text can also be determined using natural language understanding to index based on the context of the transcription. A user can then retrieve desired segments of the audio file from the database by generating a query having one or more desired parameters based on the indexed information.

34 Claims, 6 Drawing Sheets

SYSTEM AND METHOD FOR INDEXING AND QUERYING AUDIO ARCHIVES

BACKGROUND

1. Technical Field

The present application relates generally to a system and method for managing an archive of audio data and, more particularly, to an audio processing system and method for segmenting and indexing audio or multimedia files based on audio information such as speaker identity, background and/or channel, for storage in a database, and an information retrieval system and method which utilizes the indexed audio information to search the database and retrieve desired segments of audio/multimedia files.

2. Description of the Related Art

In general, management of an archive is important for maximizing the potential value of the archive. Database management is especially challenging for owners of audio/multimedia archives due to the increasing use of digital media. Indeed, the continuing increase in consumer use of audio and multimedia recording devices for memorializing various events such as radio and television broadcasts, business meetings, lectures, and courtroom testimony, has resulted in a vast amount of digital information that the consumers desire to maintain in an audio/multimedia archive for subsequent recall.

This increasing volume of digital information compels database owners to continuously seek techniques for efficiently indexing and storing such audio data in their archives in some structured form so as to facilitate subsequent retrieval of desired information. Accordingly, a system and method for indexing and storing audio data, and an information retrieval system which provides immediate access to audio data stored in the archive through a description of the content of an audio recording, the identity of speakers in the audio recording, and/or a specification of circumstances surrounding the acquisition of the recordings, is desirable.

SUMMARY OF THE INVENTION

The present application is directed to a system and method for managing a database, of audio/multimedia data. In one aspect of the present invention, a system for managing a database of audio data files comprises:

- a segments for dividing an input audio data file into segments by detecting speaker changes in the input audio data file;
- speaker identifier for identifying a speaker of each segment and assigning at least one identity tag to each segment;
- a speaker verifier for verifying the at least one identity tag of each segment; and
- an indexer for indexing the segments of the audio data file for storage in a database in accordance with the identification tags of verified speakers.

In another aspect of the present invention, the system further comprises a search engine for retrieving one or more segments from the database by processing a user query based on an identity of a desired speaker.

In another aspect of the present invention, the system for managing a database of audio/multimedia files further indexes audio/multimedia files and data streams according to audio information such as, background environment (music, street noise, car noise, telephone, studio noise, speech plus music, speech plus noise, speech over speech), and channel (microphone, telephone) and/or the transcription of the spoken utterances, and the user may retrieve stored audio segments from the database by formulating queries based on one or more parameters corresponding to such indexed information.

These and other aspects, features and advantages of the present invention will be discussed and become apparent from the following detailed description of preferred embodiments, which is to be read in connection with the accompanying drawings.

DETAILED DESCRIPTION OF PREFERRED EMBODIMENTS

It is to be understood that the invention described herein may be implemented in various forms of hardware, software, firmware, special purpose processors, or a combination thereof. Preferably, the present invention is implemented in software as an application program tangibly embodied on a program storage device. The application program may be uploaded to, and executed by, a machine having any suitable architecture. Preferably, the machine is implemented on a computer platform comprising hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present system and method.

Figure 1:
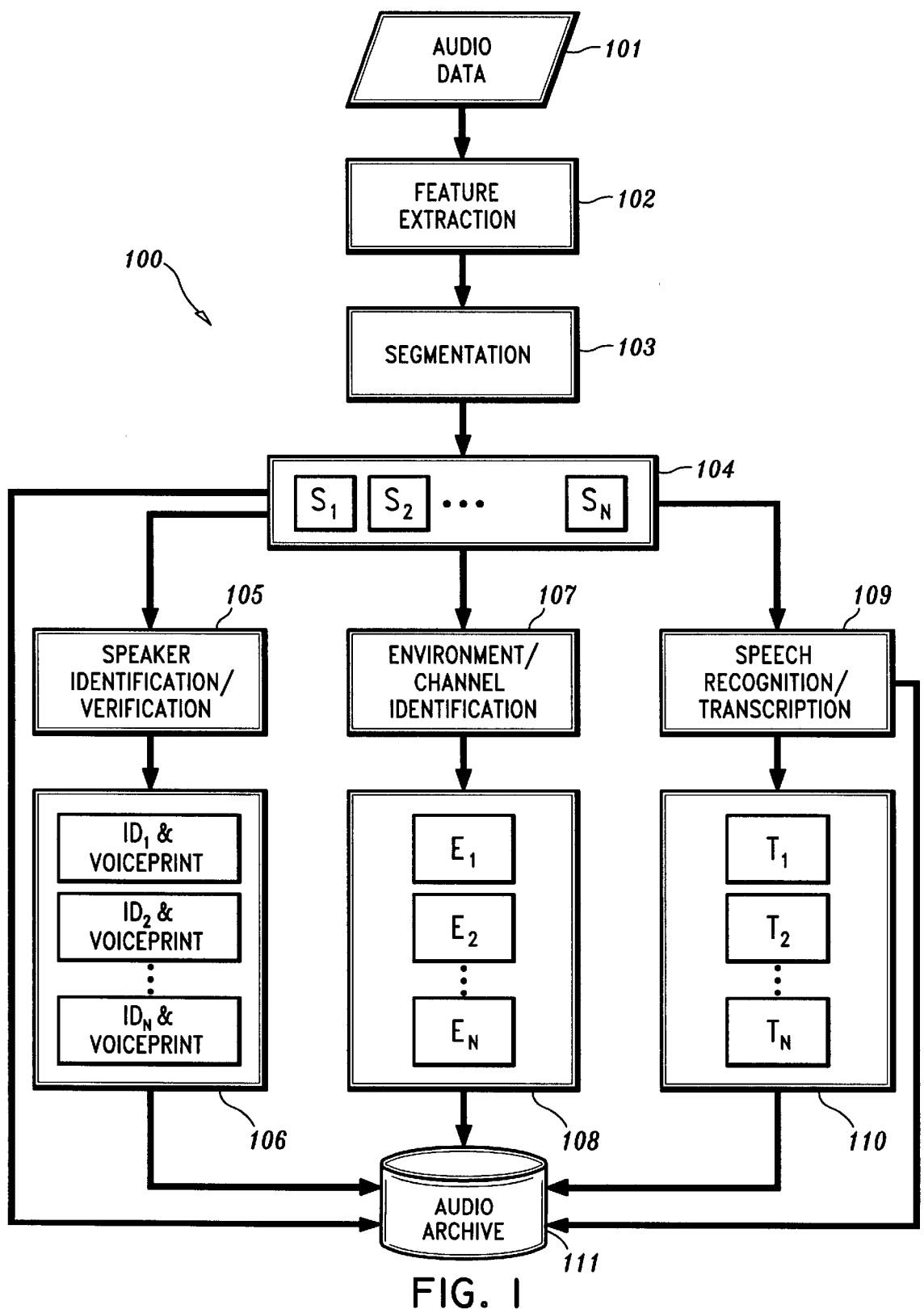
FIG. 1 is a block diagram of an audio indexing system in accordance with an embodiment of the present invention.

Referring now to FIG. 1, a block diagram illustrates a system for processing and indexing an audio/multimedia file in accordance with an embodiment of the present invention. In general, an audio indexing system 100 receives an audio data stream 101 comprising, for example, a stored acoustic/multimedia file, real-time acoustic utterance or any signal representing acoustical content. The source of the audio stream 101 may be, for example, conversational speakers, a recorded video with an accompanying audio track, or any other audio source. Furthermore, the input data stream 101 may comprise various acoustic components such as clean speech, speech corrupted by noise, (e.g., music in the background), pure noise (e.g., music) with no speech, speech conducted over the telephone, and/or speech in a non-stationary noisy environment. In addition, background noise may include the following non-exhaustive list of contributions: street noise, background speech, music, studio noise, static noise, mechanical noise, air circulation noise, electrical noise, and or any combination thereof. The acoustic components may include distortion from one or more communication channels such as telephone and microphone.

The audio indexing system 100 includes a feature extraction module 102 which processes the audio data (digitized) on a frame-by-frame basis to generate a plurality of feature vectors using methods known to those skilled in the art. For instance, an n-dimensional feature vector of Mel-Warped Cepstral features may be produced for each frame of speech data, where each frame represents, e.g., 10 ms of the input acoustic data stream. A segmentation module 103 regularly divides the audio data stream 101 (or stream of feature vectors) output from the feature extraction module 102 into a plurality of segments $S_1$–$S_N$ 104. In particular, the segmentation module 103 processes the feature vectors by determining the locations in the stream of feature vectors where changes in speaker, channel and/or background occur, and then marking (e.g., time stamping) the locations. In this manner, each segment $S_1$–$S_N$ 104 represents a time interval (e.g., start time, end time) associated with a portion of the audio stream.

It is to be understood that the segmentation module 103 may employ any conventional method suitable for segmenting the audio data stream 101 by accurately detecting and marking speaker, channel and/or background changes in the audio data stream. One such technique which may be employed for segmenting the audio stream 101 is the method disclosed in U.S. patent application Ser. No. 08/595,722, entitled "Transcription of Speech Data With Segments From Acoustically Dissimilar Environments," filed on Feb. 2, 1996, which is commonly assigned and incorporated herein by reference. This method involves generating an acoustic model that represents the acoustic characteristic of each class, and then utilizes a dynamic programming algorithm (the Viterbi Algorithm) to automatically group contiguous feature vectors into segments that belong to each class. In particular, each feature vector of the input acoustic data stream (output from the feature extraction module 102) is assigned to one of a plurality of predetermined acoustic classes (e.g., telephone speech, clean speech, music-corrupted speech and noisy speech) by comparing the feature vector with the acoustic models and tagging the feature vector with the index of the acoustic model that provides the highest matching score. In this manner, the input acoustic data stream is segmented into a plurality of segments, each being assigned an ID class from a predetermined set of ID classes. Furthermore, under stationary conditions of noise (background) and channel, the segments can be further segmented according to changes in speaker without any a priori knowledge of the speaker (unsupervised segmentation). In addition, segmentation may be performed on the basis of the speaker using acoustic models of enrolled speakers. In particular, under stationary conditions of noise and channel, the input acoustic data can be segmented according to detected speaker changes as discussed in detail in the above-incorporated U.S. Ser. No. 08/595,722. It is not necessary for the speakers to be known in advance. If the channel or the background noise changes, the method can segment accordingly. Thus, this aspect of the present invention provides unsupervised segmentation of an audio data stream 101 on the basis of speaker, channel, and background changes.

Another segmentation method which may be employed is the technique disclosed in "Speaker, Environment and Channel Change Detection and Clustering Via the Bayesion Information Criterion," by S. Chen and P.S. Gopalakrishnan, Proceeding of the Speech Recognition Workshop, 1998. This method is based on a discriminative distance measure between two adjacent sliding windows operating on the stream of feature vectors (output from the feature extraction module 102). In particular, two adjacent windows each having a width of approximately 100 frames are placed at the beginning of the stream of feature vectors and shifted in time over the audio data stream. The feature vectors of each window are clustered (using, e.g., K-Means clustering algorithms) into distinct classes, each of which being representative of the different acoustic information which is to be used for indexing. These classes may be assumed to have Guassian distribution and therefore, can be paramaterized with means, variances and counts. Next, potential segmentation location points are determined by first computing distances (which are suitable for detecting different conditions) between the corresponding clusters of features (classes) in the adjacent windows, and then identifying the locations where the distance increases. A suitable algorithm is then applied to select the appropriate distance peaks as segmentation end times.

In addition, the segmentation module 103 may also employ the methods disclosed in U.S. patent application Ser. No. 08/787,037 entitled: "Automatic Background-Driven Speech Segmentation Including Speech, Music and Noise Detection, Speech Enhancement and Background Classification," filed on Jan. 28, 1997, which is commonly assigned and incorporated herein by reference. This method includes subjecting acoustic signals to a high-order LPC analysis which causes a predictable and detectable behavior of variation in the value of the resulting poles depending on the acoustic content of the signal. For instance, the poles corresponding to different acoustic components such as speech, noisy speech, pure music, and speech plus music will produce different temporal variation signatures. In this manner, the acoustic signal can be segmented according to acoustic content by tracking the movement of the poles over a set of frames and then detecting the signature (of the temporal variation of the poles) which corresponds to one or more desired acoustic components. In addition, the poles that correspond to different acoustic components can be separated or isolated from each other for further analysis or processing. And the audio stream can be segmented based on, e.g., the identified channel or background noise components which are determined to be represented by the sequence of poles of the segment.

It is to be appreciated that the segmentation process results in a plurality of segments 104, with each segment 104 representing, for example, time intervals of the audio data stream 101 having speech of distinct speakers, music, different channels and/or different background conditions. For instance, a segmentation of an audio data stream of a typical radio broadcast news report may result in segments containing speech and non-speech signals from a large variety of sources including clean speech, band-limited speech (produced by various types of microphones) telephone speech, music segments, speech over music, speech over ambient noise, and/or speech over speech.

A speaker identification/verification module 105 utilizes a plurality of pre-enrolled speaker models (or voiceprints) to perform speaker identification for each segment $S_1$–$S_N$ 104. In particular, the speaker identification/verification module 105 attempts to identify the speaker for each segment 104 by, e.g., computing the distance between the feature vectors and enrolled acoustic models using a suitable distance measure, and then assigns an ID tag (or an N-best list of ID tags) to each segment (i.e., $ID_1$–$ID_N$ 106) corresponding to the acoustic model with the highest matching score (or the N-best scores). For each ID tag assigned to a given segment, speaker verification is then performed to accept or reject the identity. The matching scores for each ID tag are stored with their corresponding segment 106.

It is to be appreciated that any suitable speaker identification/verification technique may be employed to tag the identity of the speaker to the segment, although the preferred method is the text-independent speaker verification process based on frame-by-frame feature classification as disclosed in detail in U.S. patent application Ser. No. 08/788,471 entitled: "Text Independent Speaker Recognition for Transparent Command Ambiguity Resolution And Continuous Access Control," filed on Jan. 28, 1997, which is commonly assigned to the present assignee and the disclosure of which is incorporated herein by reference.

Other speaker recognition methods which may be employed in the speaker identification/verification module 105 are the methods disclosed in U.S. patent application Ser. No. 09/237,059, entitled "Method and Apparatus for Speaker Recognition," filed on Jan. 26, 1999, and U.S. patent application Ser. No. 08/851,982, entitled "Speaker Recognition Over Large Population With Fast And Detailed Matches," filed on May 6, 1997, both of which are commonly assigned and incorporated herein by reference.

It is to be understood that the speaker identification and speaker verification steps may be combined in one step (i.e., "open set identification") wherein the rejection decision is obtained during the identification phase by combining the competition against competing models at the same time that all the speakers in the population (i.e., enrolled speakers) are evaluated.

It is to be appreciated that the present invention may be configured to (1) generate and store a voiceprint for each segment, (2) store the feature vectors for each segment and/or (3) store the actual waveform of the segment. In this manner, a user may subsequently retrieve segments of an unknown speaker by inputting, for example, either a voiceprint or one or more segments of acoustic utterances of the unknown speaker, and then searching for corresponding stored voiceprints or waveforms (as discussed in greater detail below). It is to be further appreciated that a new speaker may be enrolled by adding his/her voiceprint to the database. Specifically, if the identity of a speaker of a given segment cannot be determined using the enrolled voiceprints (e.g., there is no enrolled voiceprint for the speaker, the speaker cannot be identified and/or if all the ID tag(s) initially assigned to a given segment are rejected during the speaker verification process), the system may be configured to automatically enroll the speaker by generating a voiceprint from the feature vectors corresponding to one or more of the speaker's segments. It is to be understood that any method for enrolling unknown speakers (or generating voiceprints) may be employed, although the preferred enrollment methods are disclosed in the above-incorporated patent applications U.S. Ser. No. 08/595,722 and U.S. Ser. No. 08/788,471.

Furthermore, for each segment $S_1$–$S_N$ 104, an environment/channel identification module 107 may be included to identify the background and/or channel based on the acoustic components of a given segment and assign an appropriated tag to each segment $E_1$–$E_N$ 108. The environment/channel identification module 107 preferably comprises a vector quantizer module and stores a minimum amount of information about each enrolled channel or background, e.g., each model available and corresponding to a selectable processing channel which in a preferred embodiment, is a codebook containing about 65 codewords, their variances and optional scores provided for matching with the output of the vector quantizer. When the features associated with a block of frames have been matched to a codebook representative of a given channel or background, the channel or background is identified, and the segment is tagged with the appropriate identifier.

It is to be appreciated that, in order to provide increased accuracy for the speaker verification process, the present invention may employ the methods disclosed in U.S. patent application Ser. No. 09/240,346, entitled "Method and Apparatus For Multi-Environment Speaker Verification," filed on Jan. 29, 1999, which is commonly assigned and incorporated herein by reference. In particular, this method relates to an unsupervised environmental normalization process for speaker verification using hierarchical clustering. The method provides increased accuracy in the speaker verification process when using acoustic models that are built with training data collected in one environment to verify input audio data which is collected in one or more different environments. In many speech verification systems, it must be assumed that any source of speech can be received over any one of a number of channels, e.g., different types of microphones, telephones or communication links, which affects the parameters of a person's speech on the receiving end. Accordingly, the above-incorporated environmental normalization method may be employed to account for the different environments in which training data (used to build a voiceprint) and audio data of a given segment are collected.

In addition, the audio indexing system 100 may include a speech recognition/transcription module 109 which decodes the spoken utterances for each segment $S_1$–$S_N$ 104 and generates a corresponding transcription $T_1$–$T_N$ 110. It is to be appreciated that any conventional speech recognition/transcription method may be employed. Preferably, the speech recognition/transcription module 109 employs the methods disclosed in the above-incorporated applications U.S. Ser. No. 08/595,722 and U.S. Ser. No. 08/787,037. In particular, after the input audio data stream 101 has been segmented and the corresponding background or channel has been identified for each segment (i.e., E1 . . . EN 108), each segment may be decoded and transcribed using channel-dependent and/or background-dependent models that are specifically trained for decoding speech utterances in the corresponding acoustic environment (background/channel) identified in the segments. For example, channel identification such as a telephone channel or the characteristic distortions of different types of microphones allows the use of models which have been previously developed or adaptively trained under similar conditions. In this manner, significantly greater decoding/transcription accuracy may be obtained.

It is to be further appreciated that natural language understanding (NLU) methods may also be utilized by the speech recognition/transcription module 109 to determined the context of each transcription T1 . . . TN 110. The present invention preferably employs the natural language understanding techniques disclosed in U.S. patent application Ser.

No. 08/859,586, filed on May 20, 1997, entitled: "A Statistical Translation System with Features Based on Phrases or Groups of Words," and U.S. patent application Ser. No. 08/593,032, filed on Jan. 29, 1996, entitled "Statistical Natural Language Understanding Using Hidden Clumpings," which are both commonly assigned and incorporated herein by reference. The above-incorporated applications disclose natural language understanding techniques for paramaterizing transcribed text (using certain algorithms) into language which can be understood by the audio indexing system. In particular, the NLU methods may be employed for determining the topic and/or context of each transcription (of the corresponding segment) such that the user can subsequently search for segments via user-formulated queries directed to certain issues or topics. In addition, as discussed in further detail below, NLU methods may be employed on the query level for identifying the issue or topic of a query that is written using natural language so as to generate a search (which is executed by a search engine) based on an identified issue or topic determined by the NLU processor.

The audio indexing system 100 includes a database 111 which stores the segmented audio data stream $S_1$–$S_N$ 104 with the corresponding speaker identity tags $ID_1$–$ID_2$ 106, the environment/channel tags $E_1$–$E_N$ 108, and the corresponding transcription $T_1$–$T_N$ 110. As discussed above, each segment may also be stored with its corresponding acoustic waveform, a subset of a few seconds of acoustic features, and/or a voiceprint, depending on the application and available memory. It is to be appreciated that such data can be stored with each segment so as to provide hierarchical audio indexing based on the identity of the speaker in accordance with the methods described for audio-indexing based on the transcription of the audio using a hierarchy of accuracy levels in U.S. patent application Ser. No. 09/108,544, entitled "Audio/Video Archive System and Method For Automatic Indexing and Searching," filed on Jul. 1, 1998, which is commonly assigned and incorporated herein by reference.

Figure 2A:
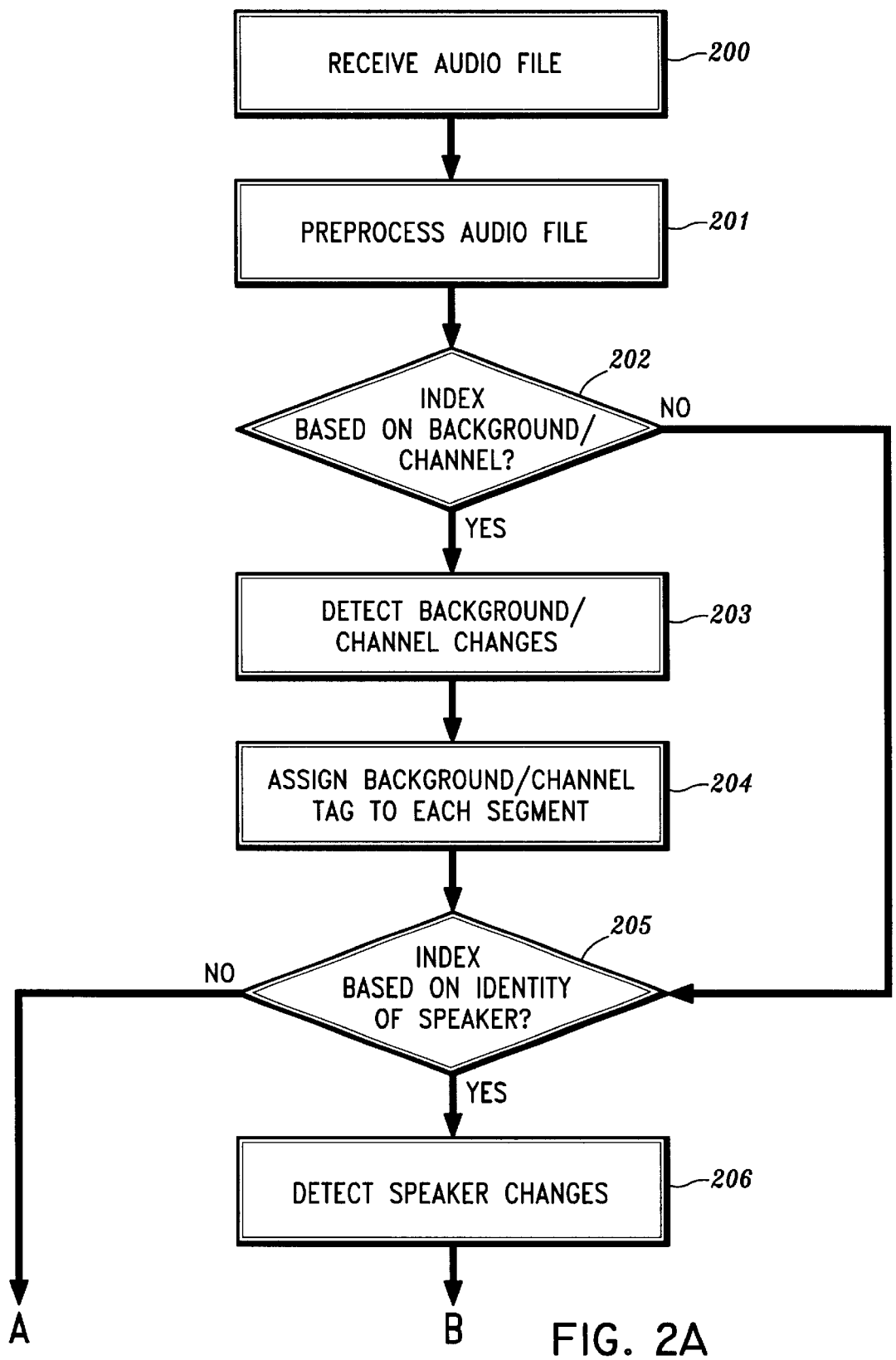
FIGS. 2A and 2B comprise a flow diagram of method for indexing an audio/multimedia file in accordance with one aspect of the present invention.
Figure 2B:
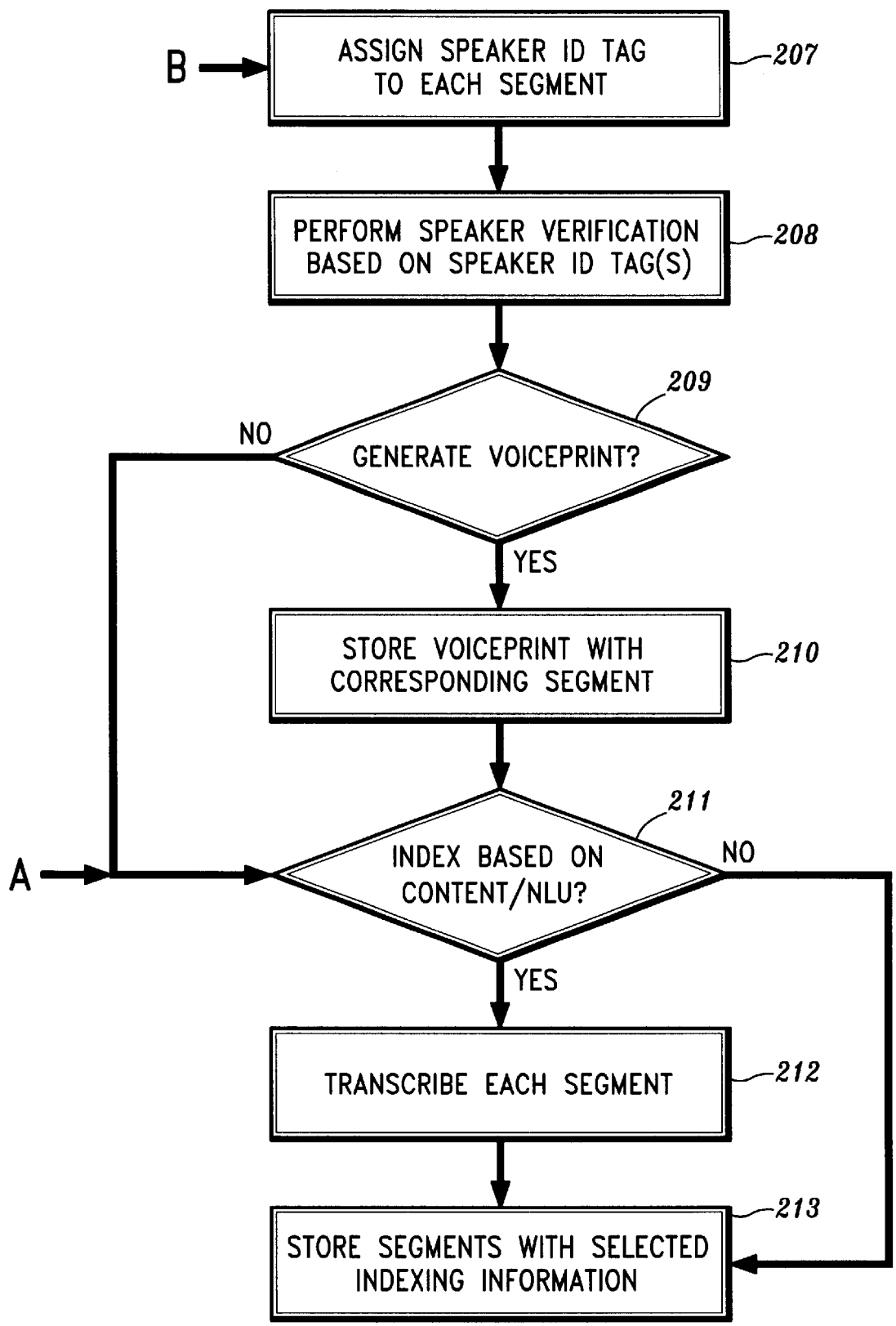

Referring now to FIGS. 2A and 2B, a block diagram illustrates a method for audio indexing in accordance with one aspect of the present invention. It is to be understood that the following process is solely for illustrative purposes and that the steps may be different depending on the manner in which the present invention is programmed. Initially, referring to FIG. 2A, the user will input an audio/multimedia file which the user desires to index and store in the audio archive (step 200). The audio file is then preprocessed (step 201) by, e.g., extracting features and generating a feature vector for each frame. Next, a determination is made as to whether the user has selected an option of having the audio file segmented based on channel and/or background conditions (step 202). If the user selects this segmentation option (affirmative result in step 202), the audio file will be segmented by detecting changes in the background and/or channel of the audio files (step 203). The acoustic features of each segment will be analyzed and a tag will be assigned to the segment corresponding to the determined background/channel (step 204).

If the user selects the option of having the audio file segmented based on speaker identity (affirmative determination in step 205), the segments are then further processed and segmented by detecting speaker changes (step 206). A speaker identification process is performed on each segment by comparing the feature vectors with previously enrolled speaker models, and assigning a ID tag (or N-best list of ID tags) to each segment based on the identified speaker (step 207). A speaker verification process is then performed to accept or reject the assigned tags (step 208). As discussed above, the speaker identification and verification steps may be combined (i.e., open set identification).

Next, a determination is made as to whether a voiceprint for a given segment is to be generated (step 209). It is to be appreciated that the system may be configured to generate a voiceprint in various circumstances. For instance, if the speaker cannot be identified (step 207) or if the verification process rejects all the assigned ID tags (step 208), it may be assumed that the segment is associated with an unknown (non-enrolled) speaker. Accordingly, the unknown speaker may be enrolled by processing the features of the segment (and other related segments) to generate a voiceprint (affirmative determination in step 209), which may subsequently be utilized for performing speaker identification/verification. In addition, the system may be configured to generate a voiceprint for each segment and store the voiceprint with its corresponding segment (step 210) for purposes of retrieving desired segments (as discussed below).

Next, a determination is made as to whether the user has selected an option of having each segment indexed based on the textual content and/or the topic/issue of the segment (step 211). If this option is selected (affirmative result in step 211), each segment will be decoded to recognize and transcribe the spoken words associated with each segment (step 212). As explained above, speech recognition may be performed based on the detected background/channel of a given segment using a speech model specifically trained for decoding speech utterances in the acoustic environment of the segment. In addition, NLU decoding may be applied to analyze the topic or issue related to the transcribed speech for each segment, and store this information with the segment. After the audio file is processed, each segment is stored with the corresponding indexing information in the audio archive (step 213).

It is to be understood that the segmentation process can be performed either prior to or after transcribing the audio file. In the latter situation, the alignment provided by the recognition engine prevents the segmentation processor from placing a segmentation marker in the middle of one or more spoken words. This is not important for the text-independent speaker identification techniques as described above. However, as is understood by those skilled in the art, it can reduce the accuracy of Hidden Markov Model-based decoding techniques used in the detailed match stage of the decoding process disclosed in the above-incorporated U.S. Ser. No. 08/851,982.

Figure 3:
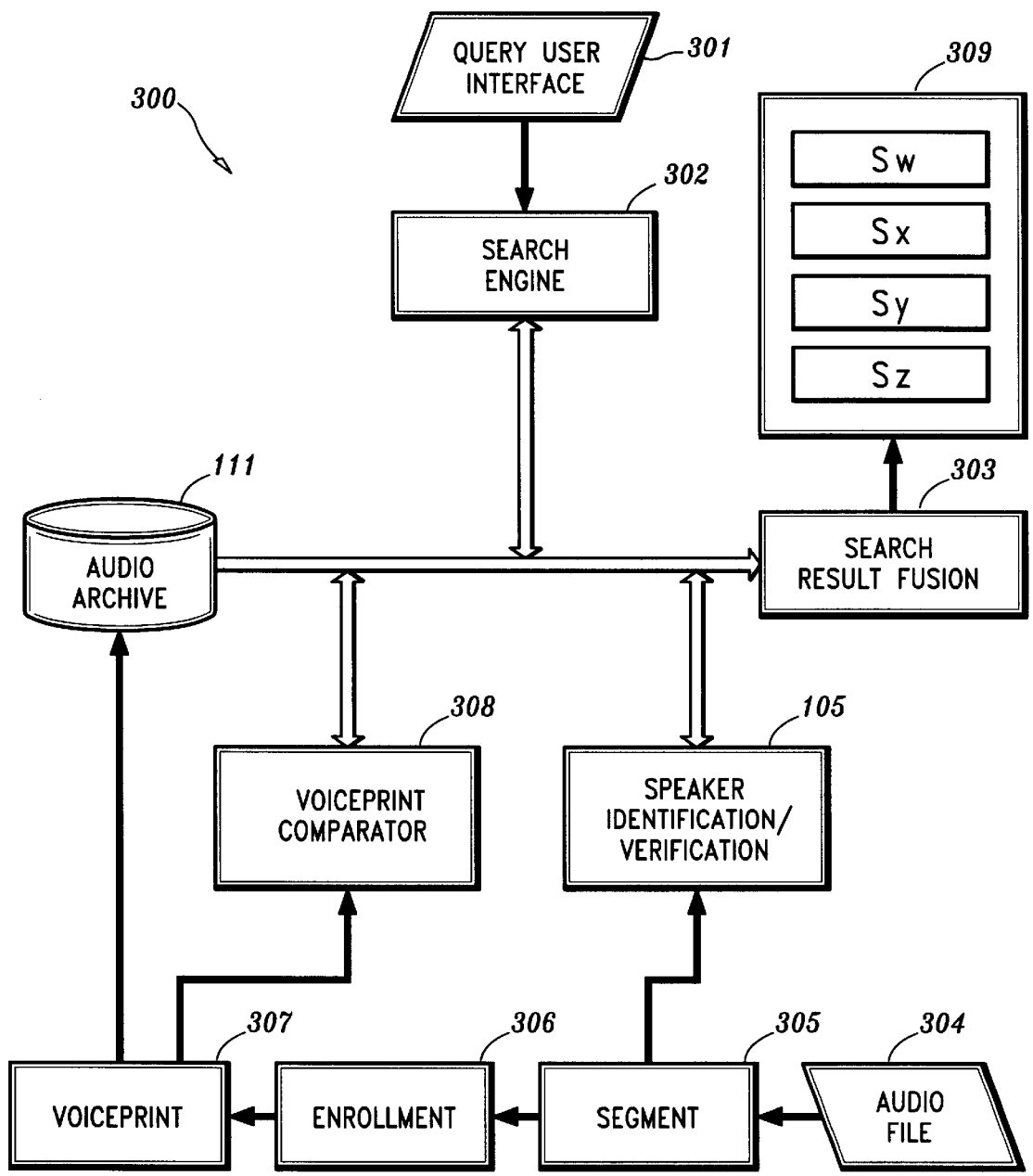
FIG. 3 is a block diagram of a system for retrieving stored audio segments in accordance with an embodiment of the present invention.

Once the audio file is indexed and stored in the audio archive 111, the user can search the stored audio files and data streams based on the tags and transcription associated with the segments. Referring now to FIG. 3, a block diagram illustrates a system for retrieving stored audio segments according to an embodiment of the present invention. The query system 300 includes a user interface (UI) 301 (e.g., a suitable graphic user interface GUI) which allows the user to search and retrieve desired audio segments from the audio archive 111 by inputting a suitable query. A search engine 302 accepts and processes the input query and searches the audio archive 111 in accordance with the query parameters of the user-formulated query. It is to be understood that the query can be any form of sequential or boolean expression as is known by those skilled in the art. The query parameters can include any combination of the indexed information such as speaker identity (ID tags), background/channel, keywords/content and/or topics/NLU content. A search result fusion module 303 combines the search results obtained by the search engine 302 in accordance with, for example, the boolean operators of the query. The output results comprise one or more segments Sw, Sx, Sy, Sz 309.

The information retrieval system 300 allows the user to search the database 111 to obtain audio segments associated with unknown speakers (e.g., segments having speakers who were not identified and/or verified during the indexing phase or segments having incorrect speaker ID tag(s)) using various techniques. For instance, the user can input an audio file 304 comprising one or more audio segments spoken by the unknown speaker (which can be in another environment and context). The segments 305 can be processed by an enrollment module 306 to generate a voiceprint 307 of the unknown speaker. A voiceprint comparator module 308 compares the voiceprint 307 with each of the stored voiceprints to retrieve matching segments having matching voiceprints associated therewith. Alternatively, it is to be appreciated that the comparison may occur directly between the waveform (of the segment 305) and the stored voiceprints or the features of the segment 305 and the stored voiceprints. It is to be understood that any conventional method may be employed in the comparator 108, although the preferred methods are disclosed in U.S. patent application Ser. No. 09/237,063, filed on Jan. 26, 1999, entitled "Method For Measuring Distance Between Collections of Distributions," which is commonly assigned and incorporated herein by reference. The identity of the speaker for each retrieved segment can then be verified by the speaker identification/verification module 105.

In another method, the user can directly input a previously generated voiceprint of the unknown speaker to retrieve desired segments (in which case the comparator 308 will compare the input voiceprint with the stored voiceprints of the segments). In addition, the user can browse the audio archive to select a stored segment that the user knows is associated with the unknown speaker, and then compare the stored acoustic information (e.g., waveform, features) for the selected segment with the stored acoustic information with the other segments to retrieve those segments having similar acoustic information. For segments stored with corresponding waveforms or acoustic features, the methods disclosed in the above-incorporated patent application U.S. Ser. No. 08/788,471 can be used to compare the waveforms or acoustic feature (in which case the comparison is similar to a speaker identification and verification process) and retrieve segments with matching scores.

Figure 4A:
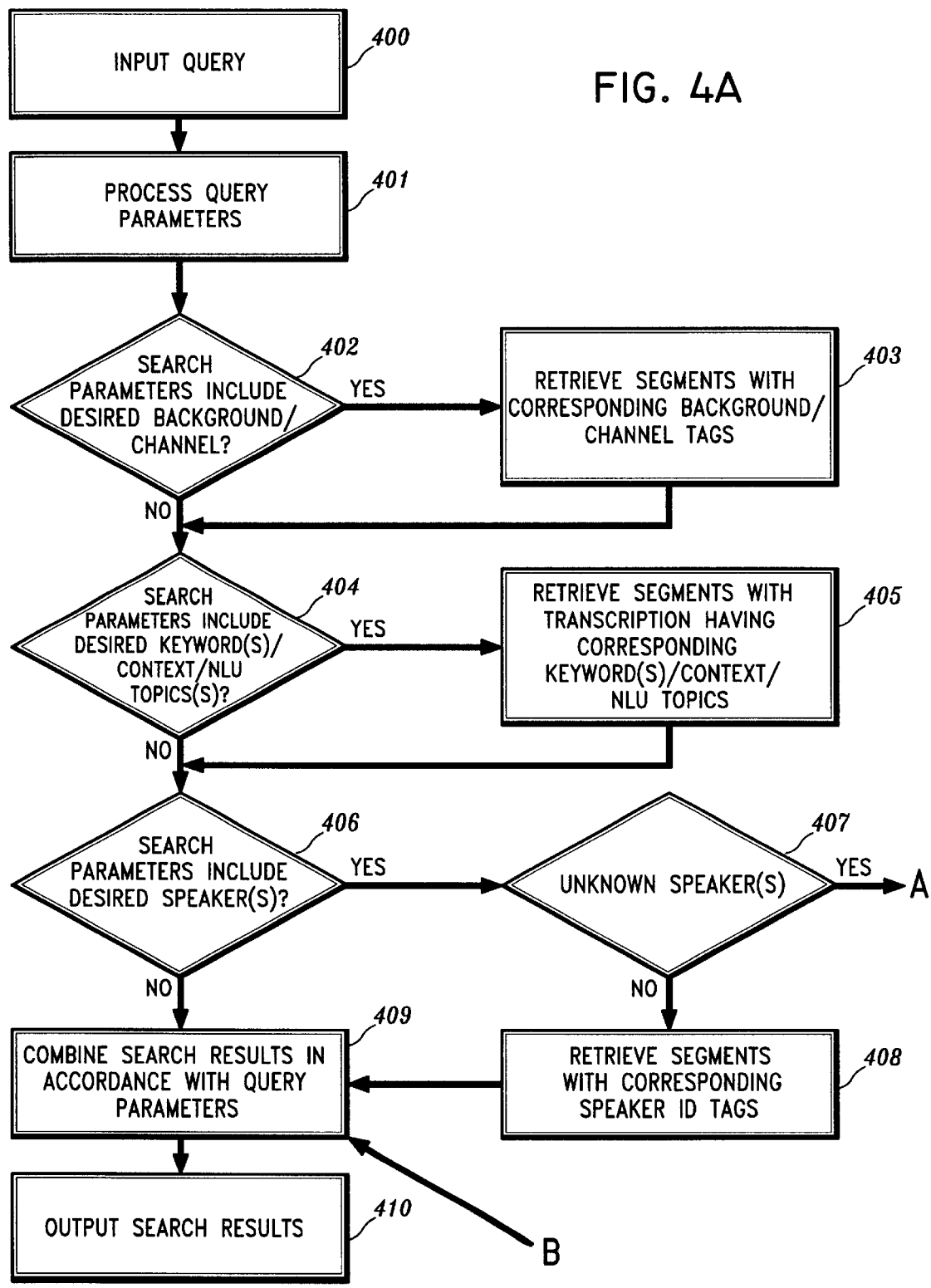
FIGS. 4A and 4B comprise a flow diagram of method for retrieving stored audio segments in accordance with one aspect of the present invention.
Figure 4B:
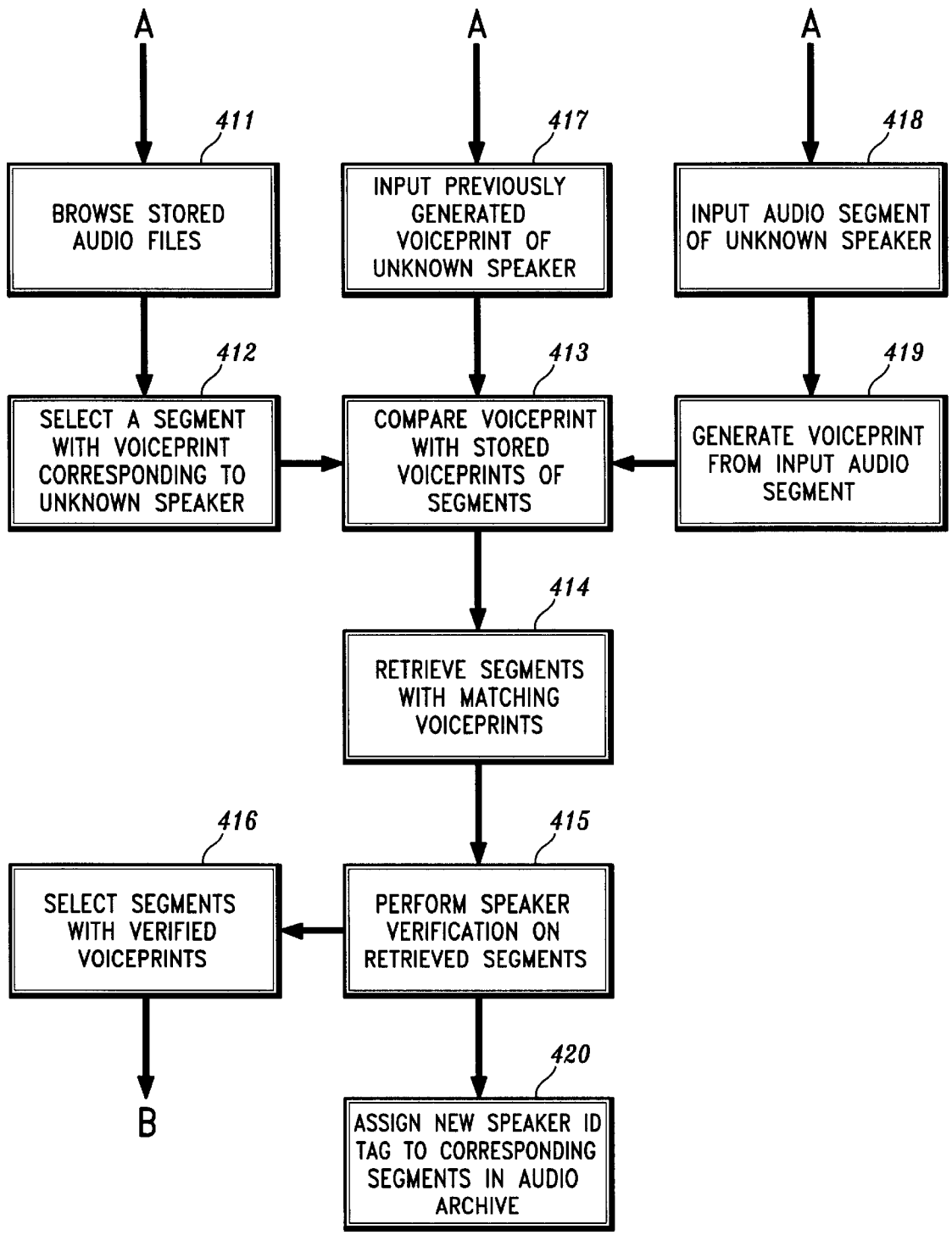

Referring now to FIGS. 4A and 4B, a flow diagram illustrates a method for retrieving segments of an audio/multimedia file in accordance with one aspect of the present invention. Initially, the user will enter a desired query (step 400) and the query parameters will be processed by the search engine (step 401). The input query may be one or more natural language text sentences which are processed using NLU methods to extract the corresponding topic(s) or issue(s) of the text sentence(s) (i.e., extract search parameters). If the search parameters include references to one or more desired background/channel(s), the search engine will search the background/channel tags of the stored segments and retrieve those segments having tags that correspond to the desired background/channel(s) (step 403). In addition, if the search parameters include desired keyword(s) and/or textual context(s), and/or NLU topic (step 404), the search engine will search the transcriptions associated with the stored segments and retrieve segments whose transcriptions contain the desired keyword(s) and/or textual context(s) and/or NLU topic(s) (step 405). Furthermore, if the search parameters include references to one or more speakers (step 406), a determination is made as to whether the speaker(s) are unknown (step 407). If the speakers are known (negative result in step 407), the search engine will search the list of ID tags or N-Best list of ID tags and retrieve the segments having ID tags associated with the desired speaker(s) step 406). The search results are then processed and combined in accordance with the boolean operators (step 409) and the search results (segments) will be output (step 410).

On the other hand, if it is determined that the query parameters include an unknown speaker(s) (affirmative result in step 407), then one of a plurality of methods can be applied to retrieve segments associated with the unknown speaker. For instance, the user can be prompted to browse the audio files stored in the audio archive (step 411) and select a segment associated with the user (step 412). The stored voiceprint corresponding to the selected segment is then compared with the stored voiceprints of all the audio segments (step 413) and the segments with matching scores are retrieved (step 414). A speaker verification process is then performed to accept or reject each retrieved segments based on the voiceprint of the selected segment (step 415) and the only those verified segments are selected for output (step 416).

In another method, the user can be prompted to input a previously generated voiceprint of the unknown speaker (step 417) and the above process is repeated for the input voiceprint (repeat steps 413–416). In yet another method, the user can be prompted input an audio segment comprising spoken utterances of the unknown speaker (step 418). A voiceprint can then be generated from the audio segment (step 419) and the above process is repeated for the generated voiceprint (repeat steps 413–416). Alternatively, as discussed above, if voiceprints are not stored with their corresponding segments, a comparison can be made between the actual waveform or the waveform features (input by the user) and waveforms and/or features previously stored with the corresponding segments.

The above methods for retrieving segments associated with unknown speakers can then be followed by reprocessing in batch the entire audio archive to assign a new ID tag to each segment associated with the unknown speaker (step 420). In addition, it is to be appreciated that each segment that may have initially (during the indexing process) been tagged with an incorrect speaker ID tag can be re-tagged with the new ID tag (assuming of course that the voiceprint or acoustic information has a better matching score with the new ID tag).

It is to be appreciated that a search can be performed on a previous search result. For instance, a user may perform a search to retrieve segments associated with a particular channel or have a particular keyword. The search results can then be searched, for example, to retrieve the segments associated with a particular individual. In this manner, the speaker ID tags will only be looked for among the segments from the previous search. Likewise, the user may perform an initial search to retrieve segments associated with a particular individual followed by a search for a particular transcription. Again, only the transcriptions associated with the segments selected based on the first search (i.e., the speakers identity) will be examined.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for processing an audio data file, comprising the steps of:
   segmenting the audio data file into segments based on detected speaker changes;
   performing speaker identification for each segment and assigning at least one speaker identification tag to each segment based on an identified speaker;
   verifying the identity of the speaker associated with the at least one identification tag for each segment; and
   indexing the segments of the audio data file for storage in a database in accordance with the identification tags of verified speakers.

2. The method of claim 1, further including the step of enrolling an unknown speaker of a corresponding segment.

3. The method of claim 1, further including the step of retrieving at least one segment from the database in accordance with a user query based on an identity of a desired speaker.

4. The method of claim 3, wherein the user query is a speaker identification tag and the retrieving step includes the step of selecting for output at least one segment which is indexed with at least one speaker identification tag that matches the speaker identification tag of the query.

5. The method of claim 3, further including the steps of:
   generating a voiceprint for each segment of the audio data file; and
   storing each voiceprint with its corresponding segment in the database.

6. The method of claim 5, wherein the user query is a voiceprint associated with the desired speaker, and wherein the retrieving step includes the steps of:
   comparing the input speaker voiceprint with each of the stored voiceprints of the segments; and
   selecting at least one segment having a corresponding voiceprint stored therewith that matches the input voiceprint.

7. The method of claim 5, wherein the user query is an audio segment of the desired speaker, and wherein the retrieving step includes the steps of:
   generating a voiceprint from the input audio segment;
   comparing the generated voiceprint with each of the stored voiceprints of the segments; and
   selecting at least one segment having a corresponding voiceprint stored therewith that matches the generated voiceprint.

8. The method of claim 5, further including the step of storing for each segment one of a corresponding waveform, acoustic features, and both.

9. The method of claim 8, wherein the user query is an audio segment of the desired speaker, and wherein the retrieving step includes the steps of:
   comparing the audio segment with one of the stored waveforms and stored acoustic features of each of the segments in the database; and
   selecting at least one segment having a corresponding one of a waveform and acoustic features stored therewith that match the audio segment of the speaker of interest.

10. The method of claim 9, wherein the audio segment of the speaker of interest is one of input by the user and selected from the database.

11. The method of claim 1, further including the steps of:
    segmenting the audio data file into segments based on detected changes in environment; and
    identifying at least one environment of each segment and assigning at least one environment tag to each segment corresponding to the at least one identified environment;
    wherein the indexing step further includes indexing the segments of the audio data file for storage in the database in accordance with the environment tags of the segments.

12. The method of claim 11, wherein the step of detecting changes in environment includes detecting changes in one of a background noise, a channel, and a combination thereof.

13. The method of claim 11, including the step of retrieving at least one segment from the database in accordance with a user query based on one of an identity of a desired speaker, the identity of a desired environment, and a combination thereof.

14. The method of claim 1, further including the steps of:
    recognizing spoken words of each segment; and
    storing the recognized words for each corresponding segment in the database.

15. The method of claim 14, wherein the recognizing step includes the steps of:
    identifying one of channel acoustic components, background acoustic components, and a combination thereof, for each segment; and
    decoding the spoken words of each segment using trained models based on the identified acoustic components.

16. The method of claim 14, further including the steps of:
    performing natural language understanding (NLU) of the recognized words of each segment to determine at least one NLU topic of each segment;
    wherein the indexing step further includes indexing the segments of the audio data file for storage in the database in accordance with the determined NLU topics.

17. The method of claim 16, including the step of retrieving at least one segment from the database in accordance with a user query based on one of an identity of a speaker of interest, at least one user-selected keyword, context of the recognized words text, at least one NLU topic, and a combination thereof.

18. A program storage device readable by a machine, tangibly embodying a program of instructions executable by the machine to perform method steps for processing an audio data file, the method steps comprising:
    segmenting the audio data file into segments based on detected speaker changes;
    performing speaker identification for each segment and assigning at least one speaker identification tag to each segment based on an identified speaker;
    verifying the identity of the speaker associated with the at least one identification tag for each segment; and
    indexing the segments of the audio data file for storage in a database in accordance with the identification tags of verified speakers.

19. The program storage device of claim 18, further including instructions for performing the step of retrieving at least one segment from the database in accordance with a user query based on an identity of a desired speaker.

20. The program storage device of claim 18, further including instructions for performing the steps of:
    segmenting the audio data file into segments based on detected changes in environment; and identifying at least one environment of each segment to assign at least one environment tag to each segment corresponding to the at least one identified environment;

wherein the instructions for performing the indexing step further include instructions for indexing the segments of the audio data file for storage in the database in accordance with the environment tags.

21. The program storage device of claim 20, wherein the step of detecting changes in environment includes detecting changes in one of a background, a channel, and a combination thereof.

22. The program storage device of claim 20, further including instructions for performing the step of retrieving at least one segment from the database in accordance with a user query based on one of an identity of a desired speaker, the identity of a desired environment, and a combination thereof.

23. The program storage device of claim 18, further including instructions for performing the steps of:

recognizing spoken words of each segment; and storing the recognized words for each corresponding segment in the database.

24. The program storage device of claim 23, wherein the instructions for performing the recognizing step include instructions for performing the steps of:

identifying one of channel acoustic components, background acoustic components, and a combination thereof, for each segment; and decoding the spoken words of each segment using trained models based on the identified acoustic components.

25. The program storage device of claim 23, further including instruction for performing the steps of:

performing natural language understanding (NLU) of the recognized words of each segment to determine at least one NLU topic of each segment;

wherein the instructions for performing the indexing step include instructions for indexing the segments of the audio data file for storage in the database in accordance with the determined NLU topics.

26. The program storage device of claim 25, further including instructions for performing the step of retrieving at least one segment from the database in accordance with a user query based on one of an identity of a speaker of interest, at least one user-selected keyword, context of the recognized words text, at least one NLU topic, and a combination thereof.

27. A system for managing a database of audio data files, comprising:

a segments for dividing an input audio data file into segments by detecting speaker changes in the input audio data file;

a speaker identifier for identifying a speaker of each segment and assigning at least one identity tag to each segment;

a speaker verifier for verifying the at least one identity tag of each segment; and an indexer for indexing the segments of the input audio data file for storage in the database in accordance with the identity tags of verified speakers.

28. The system of claim 27, further comprising a search engine for retrieving at least one segment from the database by processing a user query based on an identity of a desired speaker.

29. The system of claim 27, wherein the segments divides the audio data file into segments based on detected changes in environment, and wherein the system further comprises an environment identifier for identifying at least one environment of each segment and assigning at least one environment tag to each segment corresponding to the at least one identified environment, and wherein the indexer further indexes the segments of the audio data file for storage in the database in accordance with the environment tags.

30. The system of claim 29, wherein the detected environment changes include one of background, channels, and a combination thereof.

31. The system of claim 29, further comprising a search engine for retrieving at least one segment from the database indexed by one of an identity of a desired speaker, the identity of a desired environment, and a combination thereof, by processing a user query based on one of the identity of a desired speaker, the identity of a desired is environment, and a combination thereof.

32. The system of claim 27, further comprising:

a speech recognizer for recognizing spoken words of each segment, wherein the recognized words for each segment are stored in the database and indexed to the corresponding segment.

33. The system of claim 32, further comprising means for performing natural language understanding (NLU) of the recognized words of each segment to determine at least one NLU topic of each segment, wherein the indexer indexes the segments of the audio data file for storage in the database in accordance with the determined NLU topics.

34. The system of claim 33, further comprising a search engine for retrieving at least one segment from the database by processing a user query based on one of an identity of a speaker of interest, at least one user-selected keyword, context of the recognized words text, at least one NLU topic, and a combination thereof.

* * * * *